(12) United States Patent
Sample

(10) Patent No.: US 7,331,552 B2
(45) Date of Patent: Feb. 19, 2008

(54) HOLLOW PIVOT

(75) Inventor: Greg Sample, Newberg, OR (US)

(73) Assignee: InFocus Corporation, Wilsonville, OR (US)

( * ) Notice: Subject to any disclaimer, the term of this patent is extended or adjusted under 35 U.S.C. 154(b) by 74 days.

(21) Appl. No.: 11/333,963

(22) Filed: Jan. 17, 2006

(65) Prior Publication Data

US 2007/0166097 A1   Jul. 19, 2007

(51) Int. Cl.
*A47F 5/00* (2006.01)

(52) U.S. Cl. .................. 248/289.11; 248/314

(58) Field of Classification Search ............ 248/282.1, 248/289.1, 291.1, 292.12, 314, 309; 403/84, 403/93, 96, 101; 16/374, 377, 254, 260, 16/261
See application file for complete search history.

(56) References Cited

U.S. PATENT DOCUMENTS

| 5,123,768 | A | * | 6/1992 | Franklin | 403/96 |
| 5,564,852 | A | * | 10/1996 | Maxwell et al. | 403/97 |
| 5,617,106 | A | | 4/1997 | Tahmassebpur | |
| 5,661,942 | A | * | 9/1997 | Palmer | 52/653.2 |
| 5,734,716 | A | | 3/1998 | Kulberg | |
| 6,079,949 | A | * | 6/2000 | Litvin | 416/246 |
| 6,092,778 | A | * | 7/2000 | Lang et al. | 248/478 |
| 6,301,489 | B1 | | 10/2001 | Winstead | |
| 6,525,273 | B1 | | 2/2003 | Cunningham | |
| 6,588,712 | B2 | * | 7/2003 | Brell et al. | 248/58 |
| 6,629,801 | B2 | * | 10/2003 | Cheng | 403/101 |
| 6,791,501 | B2 | | 9/2004 | Maeda et al. | |
| 6,842,627 | B2 | | 1/2005 | Harsu | |
| 2003/0156891 | A1 | * | 8/2003 | Hung et al. | 403/84 |
| 2004/0179891 | A1 | * | 9/2004 | Watkins et al. | 403/96 |

* cited by examiner

*Primary Examiner*—Ramon O Ramirez
(74) *Attorney, Agent, or Firm*—Schwabe, Williamson & Wyatt

(57) ABSTRACT

Apparatuses, a system, and a method for rotatable coupling of components are disclosed herein. The apparatus may include a base having a mounting feature to couple the appparatus to a product housing and a through-hole to provide access to an interior cavity of the product housing. The apparatus may further include a flange, couple to the base having a surface and a plurality of detents disposed on the surface, the flange and the plurality of detents configured to rotatably couple to a pivot mate configured to complement one or more of the plurality of detents in a manner to allow the pivot mate to rotate from a first position relative to the apparatus to a second position creative to the apparatus.

19 Claims, 5 Drawing Sheets

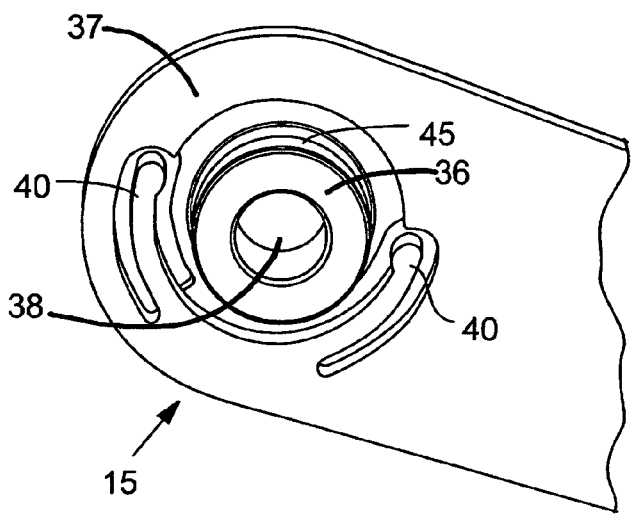
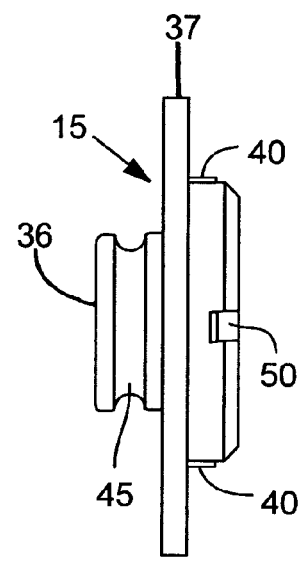
FIG. 4A
FIG. 4B
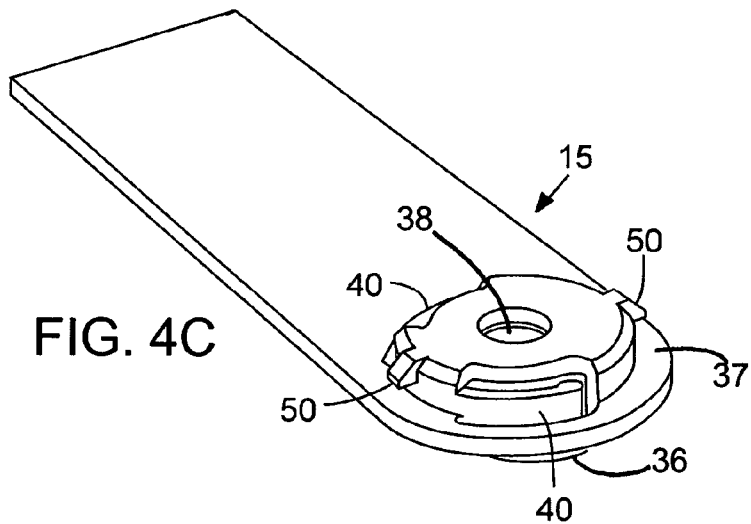
FIG. 4C

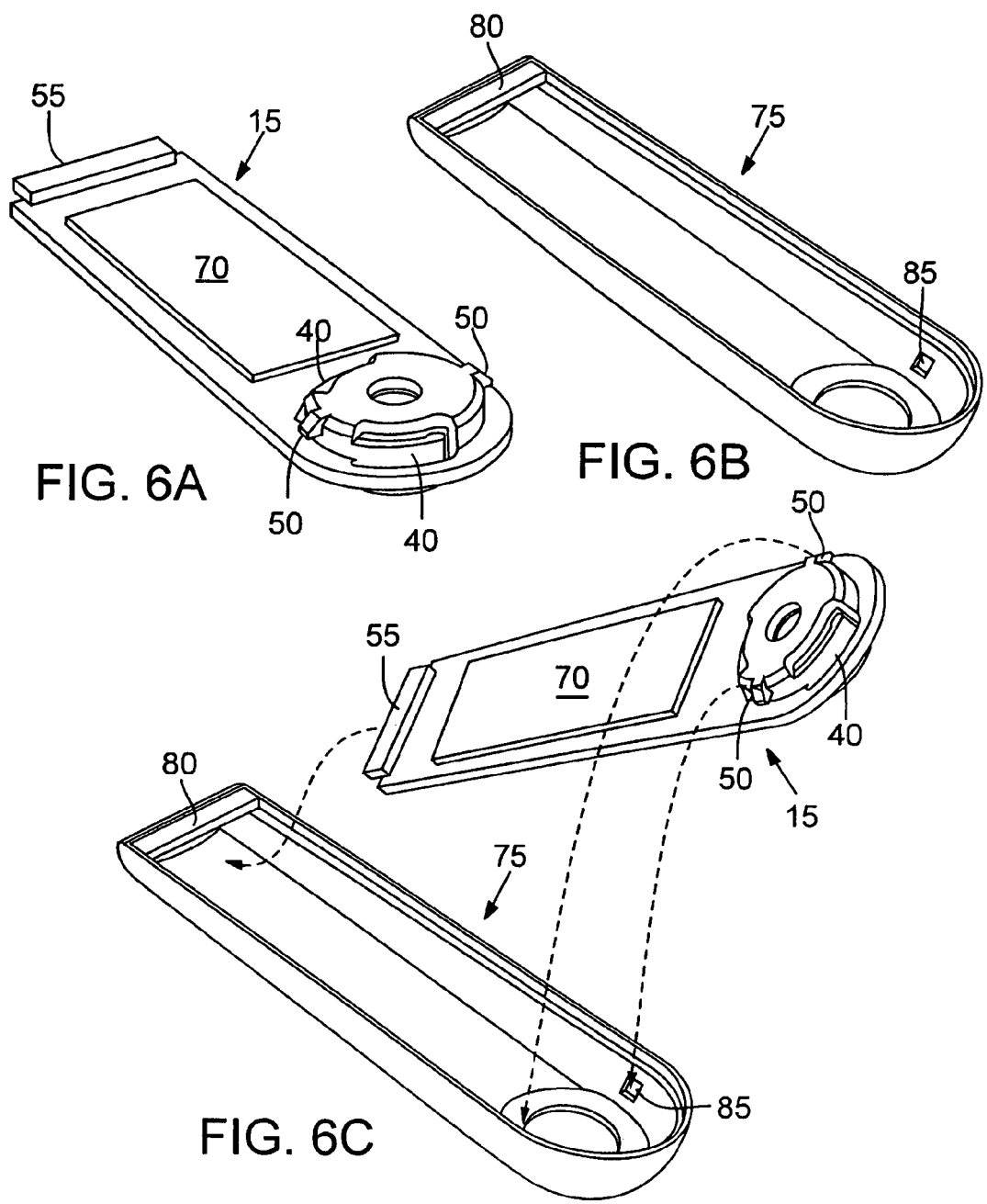

HOLLOW PIVOT

TECHNICAL FIELD

Embodiments of the invention relate generally to the fields of electronics and mechanical arts, particularly to rotating components.

BACKGROUND

Electronic devices generally are contained within various types and styles of housings. Some of these electronic devices require housings that have moveable components wherein one or more of the components change position relative to another component of the electronic device. For example, cellular telephones and notebook computers have moveable displays that generally fold over the keypad component when the device is not in use. Many other electronic devices have antenna features that must be moved into certain positions in order to permit the best reception or usability reasons, and then must be returned to another position for portability reasons or to avoid damaging the antenna feature.

Furthermore, the foregoing types of electronic devices may require electrical communication between the moving components and thus require a pivot mechanism that allows movement of the components while providing a means of passing cables or other means of electrical communication between the moving components. Still further, these types of electronic devices may also require the moving components to be capable of moving into a number of stable positions so that the best reception or operating position can be achieved.

BRIEF DESCRIPTION OF THE DRAWINGS

Embodiments of the present invention will be readily understood by the following detailed description in conjunction with the accompanying drawings. Embodiments of the invention are illustrated by way of example and not by way of limitation in the figures of the accompanying drawings.

FIG. 4A illustrates an isometric view of a pivot mate incorporated with the teachings of the present invention, in accordance with various embodiments;

FIG. 4B illustrates a top view of a pivot mate incorporated with the teachings of the present invention, in accordance with various embodiments;

FIG. 4C illustrate an isometric view of a pivot mate incorporated with the teachings of the present invention, in accordance with various embodiments;

FIGS. 6A, 6B, and 6C illustrate a pivot mate incorporated with the teachings of the present invention, in accordance with various embodiments.

DETAILED DESCRIPTION

Illustrative embodiments of the present invention include but are not limited to a pivot apparatuses, systems endowed with such apparatuses, and methods of rotatably coupling components.

In the following detailed description, reference is made to the accompanying drawings which form a part hereof and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The description may use perspective-based descriptions such as up/down, back/front, and top/bottom. Such descriptions are merely used to facilitate the discussion and are not intended to restrict the application of embodiments of the present invention.

The description may use the phrases "in an embodiment," "in various embodiments," "in various ones of these embodiments," or "in embodiments," which may each refer to one or more of the same or different embodiments. Furthermore, the terms "comprising," "including," "having," and the like, as used with respect to embodiments of the present invention, are synonymous.

The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Figure 1A:
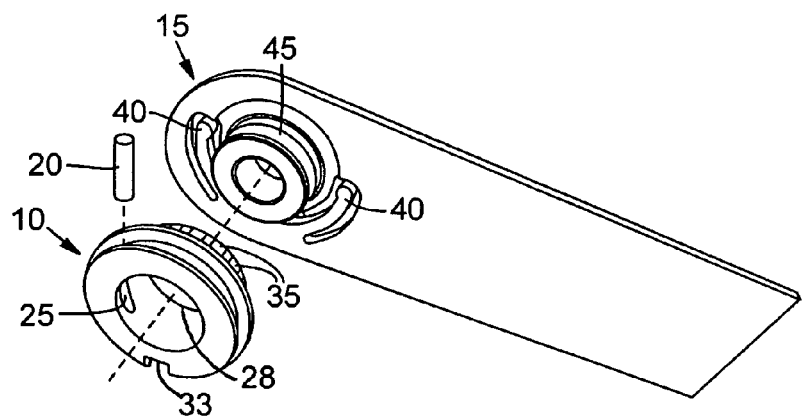
FIG. 1A illustrates an isometric view of a pivot system incorporated with the teachings of the present invention, in accordance with various embodiments.
Figure 1B:
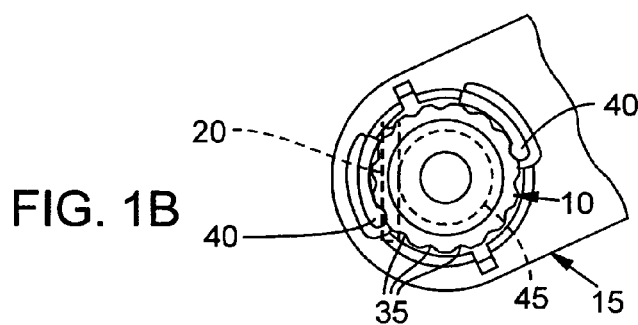
FIG. 1B illustrates a side view of a pivot system incorporated with the teachings of the present invention, in accordance with various embodiments.

Referring now to FIGS. 1A and 1B, illustrated are embodiments of a pivot system in accordance with the present invention. As illustrated, in accordance with these embodiments, the pivot system comprises a pivot member 10 coupled to a pivot mate 15 by the engagement of a pin 20 with a slot 25. FIG. 1A illustrates the components separate and FIG. 1B illustrates the components as they may be assembled, in accordance with various embodiments. As illustrated in FIG. 1B, the components may be assembled by inserting mating flange 36 of pivot mate 15 into through-hole 28 of pivot member 10 and then engaging pin 20 into slot 25. In the following discussion, embodiments of components in accordance with this invention and operation of an embodiment of a system endowed with said components will be explained.

Figure 2A:
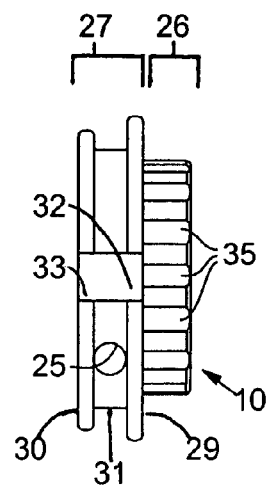
FIG. 2A illustrates an isometric view of a pivot member incorporated with the teachings of the present invention, in accordance with various embodiments.
Figure 2B:
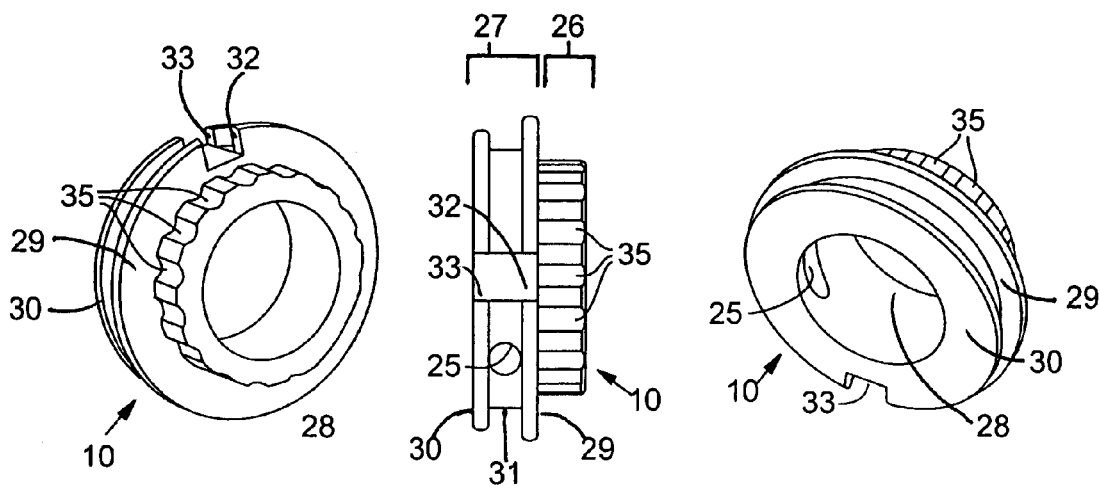
FIG. 2B illustrates a top view of a pivot member incorporated with the teachings of the present invention, in accordance with various embodiments.
Figure 2C:
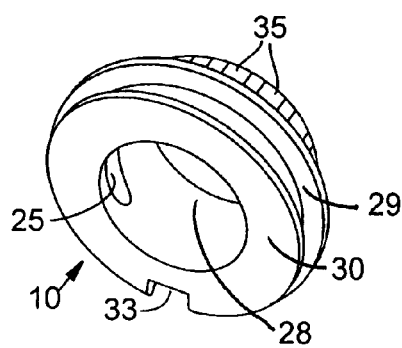
FIG. 2C illustrates an isometric view of a pivot member incorporated with the teachings of the present invention, in accordance with various embodiments.

An embodiment of a pivot member in accordance with this invention is illustrated in FIGS. 2A, 2B, and 2C. As illustrated, in accordance with these embodiments, pivot member 10 may comprise a flange 26 coupled to a base 27.

The coupling of flange 26 and base 27 may be of any type known in the art and may include, for exemplary purposes only, molding of both the base and the flange from a material to produce a unitary piece. In various embodiments, base 27 may further comprise a mounting feature to couple pivot member 10 to a product housing (see FIGS. 3A and 3B, discussed more fully below) and a through-hole 28 which may provide access to an interior cavity of a product housing.

Various embodiments of pivot member 10 in accordance with this invention may be further configured to rotatably couple to a pivot mate 15. In various ones of these embodiments, a flange 26 in accordance may have a surface and a plurality of detents 35 disposed on the surface, flange 26 and the plurality of detents 35 configured to rotatably couple to a pivot mate 15 to rotate from a first position relative to the pivot member 10 to a second position relative to the pivot member 10. In various embodiments and as discussed below, plurality of detents 35 may be configured to complement one or more cantilever arms 40 disposed on pivot mate 15 to allow pivot mate 15 to rotate from a first position relative to pivot member 10 to a second position relative to pivot member 10.

Figure 3A:
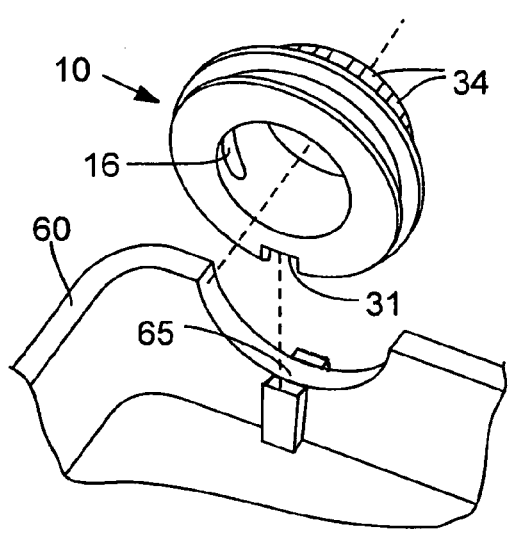
FIG. 3A illustrates an isometric view of a pivot member incorporated with the teachings of the present invention, in accordance with various embodiments.
Figure 3B:
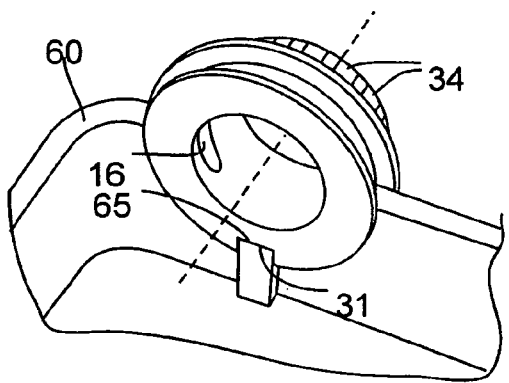
FIG. 3B illustrates a side view of a pivot member incorporated with the teachings of the present invention, in accordance with various embodiments.

Referring now to FIGS. 3A and 3B, in various ones of these embodiments, pivot member 10 may further comprise a mounting feature. Mounting features in accordance with various embodiments of the present invention may comprise a perimeter feature on the base 27 to permit pivot member 10 to straddle a product housing 60 such that a portion of the perimeter feature of pivot member 10 is on the outside of the product housing 60 and a portion of the perimeter feature is on the interior cavity of the product housing 60. In various ones of these embodiments, the perimeter feature may comprise a first tab 29 and a second tab 30, both tabs 29,30 defining a recess 31 to couple to a product housing. The recess 31 thickness may be of a different thickness than the one illustrated to accommodate different product housing thicknesses. For example, if a housing of a platform component is 5 centimeters thick, recess 31 may be configured with a width of at least 5 centimeters so as to permit first 29 and second 30 tabs to straddle the housing.

Still referring to FIGS. 3A and 3B, in various embodiments, mounting feature of pivot member 10 may further comprise a first notch 32 disposed on first tab 29 and second notch 33 disposed on perimeter tab 30 to prevent rotation of pivot member 10 relative to product housing 60. As illustrated, notches 32,33 may be configured to slidably engage a mating feature 65 on product housing 60. By engaging the notches 32,33 to a mating feature 65, pivot member 10 may be prevented from rotating relative to the product housing 60. The shape of notches 32,33 is not limited to the shape shown in the figures. For example, one skilled in the art would appreciate that a v-shaped or a square-shaped notch of varying sizes could also achieve the same result in accordance with various embodiments of the present invention.

Referring now to FIGS. 4A, 4B, and 4C, illustrated is an embodiment of a pivot mate 15 in accordance with this invention. As illustrated, pivot mate 15 may comprise a base 37 and a mating flange 36. A base 37 in accordance with various embodiments of this invention may have a through-hole 38. In various ones of these embodiments, through-hole 38 may be used to provide access to an interior cavity of a product housing. For example, in various ones of these embodiments, through-hole 38 may be used to permit passage of a cable or other means of electrically connecting a device feature with a product on an interior cavity of a product housing (discussed more fully below). Still further, in various embodiments, pivot mate 15 may comprise one or more cantilever arms 40 configured to complement one or more of a plurality of detents 35 disposed on pivot member 10 to allow pivot mate 15 to rotate from a first position relative to pivot member 10 to a second position relative to pivot member 10.

Referring now specifically to FIGS. 4A and 4B, in accordance with various embodiments, mating flange 36 may comprise a retention mechanism to allow pivot mate 15 to rotatably couple to pivot member 10. As alluded to earlier, in various embodiments in accordance with this invention, pivot member 10 and pivot mate 15 may be rotatably coupled by inserting mating flange 36 of pivot mate 15 into through-hole 28 of pivot member 10 and then engaging pin 20 into slot 25. In various ones of these embodiments, retention mechanism of pivot mate 15 may comprise a groove 45 disposed around the base 37 adapted to permit the pivot mate 15 to rotatably couple to a pivot member 10 by engaging a pin 20 with a slot 25 disposed through the pivot member 10. As illustrated in FIGS. 1A and 1B, when a mating flange 36 of pivot mate 15 is inserted into a flange 26 of pivot member 10 and a pin 20 is subsequently slidably engaged with slot 25, said locking pin 20 prevents separation of pivot mate 15 from pivot member 10 by pin 20 partially sitting within groove 45. In various ones of these embodiments, through-hole 28 and flange 26 of pivot member 10, and through-hole 38 and mating flange 36 of pivot mate 15 may be complementarily sized such that engagement of pin 20 prevents separation of the pivot mate 15 from pivot member 10. Embodiments in accordance with this invention may comprise a slot 25 and pin 20 complementarily shaped differently than the embodiments illustrated while still achieving rotatable coupling.

In various embodiments in accordance with the present invention, and as alluded to earlier, pivot member 10 may comprise a flange 26 having a surface and a plurality of detents 35 disposed on the surface. In various ones of these embodiments, flange 26 and plurality of detents 35 may be configured to rotatably couple to a pivot mate 15 configured to complement one or more of the plurality of detents 35 so as to allow the pivot mate 15 to rotate from a first position relative to the pivot member 10 to a second position relative to the pivot member 10. With respect to pivot mate 15, pivot mate 15 may comprise one or more cantilever arms 40 configured to complement one or more of a plurality of detents 35 disposed on pivot member 10 to allow the pivot mate 15 to rotate from a first position relative to the pivot member 10 to a second position relative to the pivot mate 15. Thus, in various ones of these embodiments, the detents 35 and cantilever arms 40 may be complementarily configured to allow the detents 35 to receive a cantilever arm 40 upon rotation of the pivot mate 15 relative to the pivot member 10, thereby allowing rotation of pivot mate 15 into a number of stable positions. For example, in various ones of these embodiments, complementary configuration may allow rotation of the pivot mate 15 relative to the pivot member 10 upon application of a force exceeding gravitational force, i.e., rotation will not occur unless some force is applied to the pivot member 10 and/or pivot mate 15. Still further, in various ones of these embodiments, plurality of detents 35 and cantilever arms 40 may be variously configured to require a greater or lesser amount of applied rotational force to urge rotation of the pivot mate 15 relative to pivot member 10. For example, those skilled in the art recognize that detents 35 having a greater depth than illustrated and correspondingly sized cantilever arms 40 may require more force to urge motion than detents 35 and cantilever arms 40 of a shallower configuration.

Figure 5:
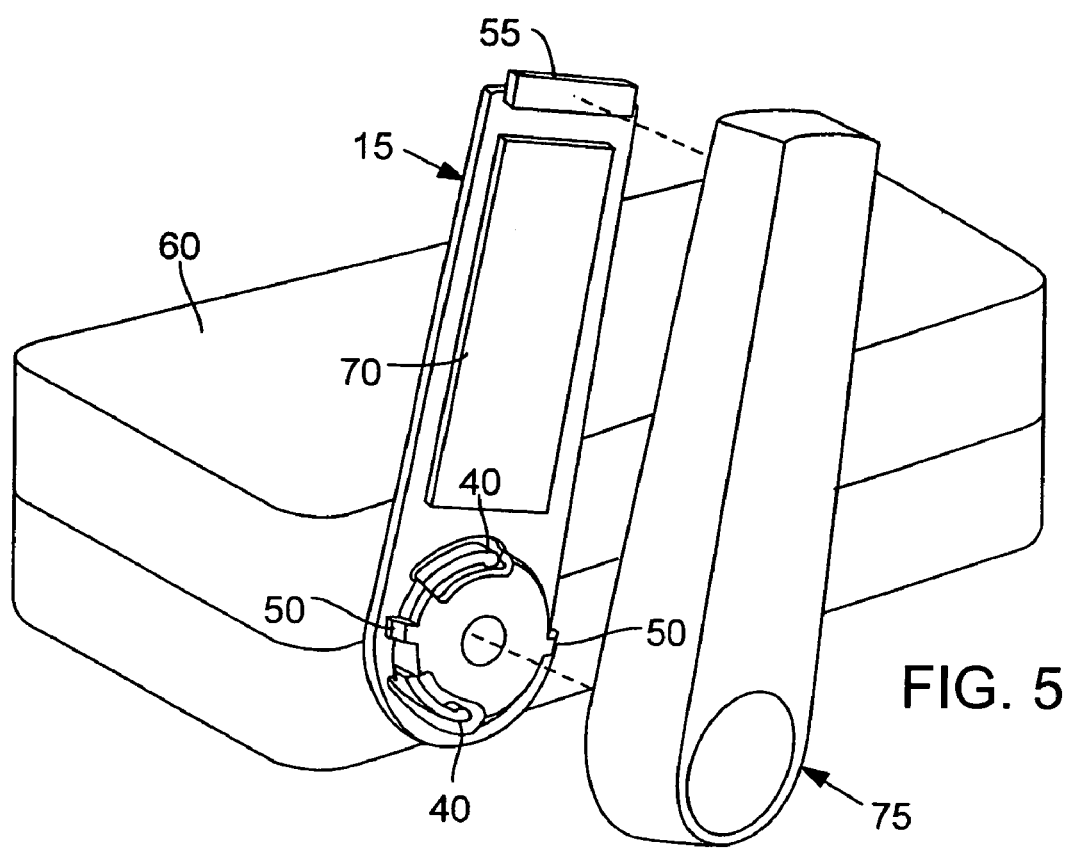
FIG. 5 illustrates a system incorporated with the teachings of the present invention, in accordance with various embodiments.

Referring now to FIG. 5, illustrated is an embodiment of a pivot mate 15 in accordance with this invention. As illustrated, in various ones of these embodiments, pivot mate 15 may be further configured to couple to a device feature 70. In various ones of these embodiments, device feature 70 may be a selected one or more of a radio frequency antenna, a wireless communication transceiver, a display device, a microphone, and an audio speaker. In various ones of these embodiments, coupling of device feature 70 to pivot mate 15 may be by any one or more methods known in the art (for example, gluing, attaching by screws, etc.). Further, in various embodiments, device feature 70 may be in electrical communication with a product (not shown) disposed in the interior cavity of a product housing 60. In various ones of these embodiments, electrical communication of device feature 70 with product may be via a cable (not shown) or similar electrical connection means connected through the through-hole 28 disposed through pivot member 10 and through-hole 38 disposed through pivot mate 15 (also shown in FIG. 1A and others).

Referring now to FIGS. 6A, 6B, and 6C (and FIG. 5), in various embodiments in accordance with the present invention, pivot mate 15 may be configured to be coupled to a cover component 75. In various ones of these embodiments, cover component 75 and pivot mate 15 may be configured to be coupled to each other by any means known in the art. For example, cover component 75 and pivot mate 15 may be configured to be coupled by compression molding, gluing, attachment by screws, or engaging a tab feature. In various embodiments, a tab feature 55 disposed on pivot mate 15 may be configured to slide under a complementary tab-undercut feature 80 disposed on a cover component 75. Further, in various ones of these embodiments, catch features 50 disposed on pivot mate 15 may be configured to engage complementary catch-pocket features 85 on cover component 75. Embodiments in accordance with invention may include enlisting one or more of multiple methods of coupling pivot mate 15 with cover component 75 depending, for example, on cost and manufacturability factors. Further, it may desirable in some applications for cover component 75 to remain removable by the end-user; for example, it may be desirable for the end-user to have the ability to open the cover component 75 to repair or replace/add to various device components 70 located on the pivot mate 15 as described above.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

The invention claimed is:

1. An apparatus comprising:
a base having:
    a mounting feature including a perimeter feature having a first tab including a first notch and a second tab including a second notch, the first and second tabs defining a recess for coupling to a product housing, and the first and second notches being configured to slidably engage a mating feature of the product housing, the engagement preventing rotation of the base relative to the product housing; and
    a through-hole to provide access to an interior cavity of the product housing; and
a flange, coupled to the base, having a surface and a plurality of detents disposed on the surface, the flange and the plurality of detents configured to rotatably couple to a pivot mate configured to complement one or more of the plurality of detents in a manner to allow the pivot mate to rotate from a first position relative to the flange to a second position relative to the flange.

2. An apparatus, comprising:
a base having:
    a mounting feature configured to couple to a product housing;
    a through-hole to provide access to an interior cavity of the product housing; and
a flange, coupled to the base, having a surface and a plurality of detents disposed on the surface, the flange and the plurality of detents configured to rotatably couple to a pivot mate configured to complement one or more of the plurality of detents in a manner to allow the pivot mate to rotate from a first position relative to the flange to a second position relative to the flange;
wherein the base further includes a slot and wherein the flange is further configured to rotatably couple to the pivot mate by engaging a pin with the slot.

3. An apparatus, comprising:
a base having:
    a through-hole to provide access to an interior cavity of a product housing; and
    a cantilever arm configured to complement one or more of a plurality of detents disposed on a pivot member to allow the base to rotate from a first position relative to the pivot member to a second position relative to the pivot member;
a mating flange, coupled to the base, having a retention mechanism to allow the base to rotatably couple to the pivot member.

4. The apparatus of claim 3, wherein the retention mechanism comprises a groove disposed around the mating flange, the groove adapted to permit the mating flange to rotatably couple to the pivot member by engaging a pin with a slot disposed through the pivot member.

5. The apparatus of claim 3, wherein the base is further configured to couple to a device feature.

6. The apparatus of claim 3, wherein the base is further configured to couple to a cover component.

7. The apparatus of claim 6, wherein the cover component and the base are configured to couple by a selected one or more of compression molding; gluing; attachment of screws; and sliding of a tab feature disposed on the base into a corresponding tab-undercut feature on the cover component and engagement of a catch feature disposed on the base to a corresponding catch-pocket feature on the cover component.

8. A system, comprising:
a pivot member, including:
    a mounting feature configured to couple to a product housing;

a first through-hole to provide access to an interior cavity of the product housing; and a flange, having a surface and a plurality of detents disposed on the surface; and a pivot mate, including:

a pivot mate base having:

a second through-hole to provide access to the interior cavity of a product housing; and a cantilever arm configured to complement one or more of the plurality of detents of the pivot member to allow the pivot mate base to rotate from a first position relative to the pivot member to a second position relative to the pivot member; and a mating flange, coupled to the pivot mate base, having a retention mechanism to allow the pivot mate to rotatably couple to the pivot member;

a product housing; and a device feature.

9. The system of claim 8, wherein the device feature is in electrical communication with a product disposed in the interior cavity of the product housing, said electrical communication being via one or more cables disposed in the first and second through-holes.

10. The system of claim 8, wherein the device feature is a selected one or more of a radio frequency antenna, a wireless communication transceiver, a display device, a microphone, and an audio speaker.

11. A method, comprising:

mounting a pivot member to a product housing, the pivot member comprising:

a pivot member base having:

a mounting feature configured to couple to the product housing; and a first through-hole to provide access to an interior cavity of the product housing; and a flange, coupled to the base, having a surface and a plurality of detents disposed on the surface;

rotatably coupling a pivot mate to the pivot member, the pivot mate comprising:

a pivot mate base having:

a second through-hole to provide access to the interior cavity of the product housing; and a cantilever arm configured to complement one or more of a plurality of detents of the pivot member to allow the pivot mate to rotate from a first position relative to the pivot member to a second position relative to the pivot member;

a mating flange, coupled to the pivot mate base, having a retention mechanism to allow the pivot mate to rotatably couple to the pivot member; and coupling a device feature to the pivot mate.

12. The method of claim 11, wherein the mounting feature comprises a perimeter feature with a first tab and a second tab, the first and second tabs defining a recess coupling to the product housing.

13. The method of claim 12, wherein a first notch is disposed in the first tab and a second notch is disposed in the second tab, the first and second notches being configured to slidably engage a mating feature on the product housing, the engagement preventing rotation of the pivot member relative to the product housing.

14. The method of claim 11, wherein the pivot member base further comprises a slot and wherein the pivot member is further configured to rotatably couple to the pivot mate by engaging a pin with the slot.

15. The method of claim 11, wherein the retention mechanism comprises a groove disposed around the mating flange, the groove adapted to permit the mating flange to rotatably couple to the pivot member by engaging a pin with a slot disposed through the pivot member.

16. The method of claim 11, further comprising electrically coupling the device feature with a product disposed in the interior cavity of the product housing, said electrical communication being via one or more cables disposed in the first and second through-holes.

17. The method of claim 11, wherein the device feature is a selected one or more of a radio frequency antenna, a wireless communication transceiver, a display device, a microphone, and an audio speaker.

18. The method of claim 11, further comprising:

coupling a cover component to the pivot mate.

19. The method of claim 18, wherein coupling the cover component to the pivot mate comprises a selected one or more of compression molding; gluing; attaching by screws; and sliding of a tab feature disposed on the pivot mate into a corresponding tab-undercut feature on the cover component and engagement of a catch feature disposed on the pivot mate to a corresponding catch-pocket feature on the cover component.

* * * * *